US005308098A

United States Patent [19]

Shea

[11] Patent Number: 5,308,098

[45] Date of Patent: May 3, 1994

[54] SELF-PROPELLED ALL TERRAIN WHEELCHAIR

[76] Inventor: Brian J. Shea, 2122 N. Sawmill, Cedar City, Utah 84720

[21] Appl. No.: 50,606

[22] Filed: Apr. 22, 1993

[51] Int. Cl.[5] .............................................. B62M 1/14

[52] U.S. Cl. ................................ 280/250.1; 280/5.22; 305/60

[58] Field of Search .................... 280/5.22, 250, 250.1, 280/304.1; 305/60, 9

[56] References Cited

U.S. PATENT DOCUMENTS 3,068,950 12/1962 Davidson .......................... 280/5.22
3,259,200 7/1966 Maijala .............................. 280/5.22
4,274,651 6/1981 Dument ............................ 280/250.1
5,020,818 6/1991 Oxford ............................. 280/250.1

*Primary Examiner*—Margaret A. Focarino
*Assistant Examiner*—Carla Mattix
*Attorney, Agent, or Firm*—Hugh E. Smith

[57] ABSTRACT

A wheelchair adapted for use both on smooth surfaces and uneven or rough ground wherein a cleated belt is trained around a plurality of wheels on both sides of the chair and is driven by a spring-loaded handgrip engaging therewith. Means are provided for tensioning the belt and for locking the hand grip in engagement with such belt.

6 Claims, 3 Drawing Sheets

SELF-PROPELLED ALL TERRAIN WHEELCHAIR

BACKGROUND OF THE INVENTION

1. Field of the Invention

The present invention relates to wheelchairs and more particularly pertains to such chairs which may be used over varied terrain.

2. Description of the Prior Art

The use of track-driven wheelchairs is known in the prior art. More specifically, such chairs heretofore devised and utilized for the purpose of negotiating rough terrain are known to consist basically of familiar, expected and obvious structural configurations, notwithstanding the myriad of designs encompassed by the crowded prior art which have been developed for the fulfillment of countless objectives and requirements.

Specifically, such a chair is illustrated in U.S. Pat. No. 5,020,818 to Stuart G. Oxford. Motive power is provided by a pump-type action of a rachet arm. The usual wheelchair user is accustomed to a forward and back hand motion, gripping the wheel to provide motive power. Other more conventional wheelchairs are shown in U.S. Pat. Nos. 4,805,712; 4,666,170; and 4,825,971.

In this respect, the wheelchair according to the present invention substantially departs from the conventional concepts and designs of the prior art, and in so doing provides an apparatus primarily developed for the purpose of all terrain use operable much in the accustomed manner of a conventional wheelchair.

Therefore, it can be appreciated that there exists a continuing need for new and improved wheelchair which can be operated over rough terrain. In this regard, the present invention substantially fulfills this need.

SUMMARY OF THE INVENTION

In view of the foregoing disadvantages inherent in the known types of wheelchairs now present in the prior art, the present invention provides an improved wheelchair construction wherein the same can be utilized over varied terrain. As such, the general purpose of the present invention, which will be described subsequently in greater detail, is to provide a new and improved all terrain wheelchair which has all the advantages of the prior art chairs and none of the disadvantages.

To attain this, the present invention essentially comprises a wheelchair adapted for use both on smooth surfaces and uneven or rough ground wherein a cleated belt is trained around a plurality of wheels on both sides of the chair and is driven by a spring-loaded handgrip engaging therewith. Means are provided for tensioning the belt and for locking the hand grip in engagement with such belt.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved wheelchair which has all the advantages of the prior art wheelchairs and none of the disadvantages.

It is another object of the present invention to provide a new and improved all terrain wheelchair which may be easily and efficiently manufactured and marketed.

It is a further object of the present invention to provide a new and improved all terrain wheelchair which is of a durable and reliable construction.

An even further object of the present invention is to provide a new and improved all terrain wheelchair which is susceptible of a low cost of manufacture with regard to both materials and labor, and which accordingly is then susceptible of low prices of sale to the consuming public, thereby making such chairs economically available to the buying public.

Still yet another object of the present invention is to provide a new and improved wheelchair which provides in the apparatuses and methods of the prior art some of the advantages thereof, while simultaneously overcoming some of the disadvantages normally associated therewith.

Still another object of the present invention is to provide a new and improved self-propelled wheelchair.

Yet another object of the present invention is to provide a new and improved wheelchair capable of negotiating rough and uneven ground.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
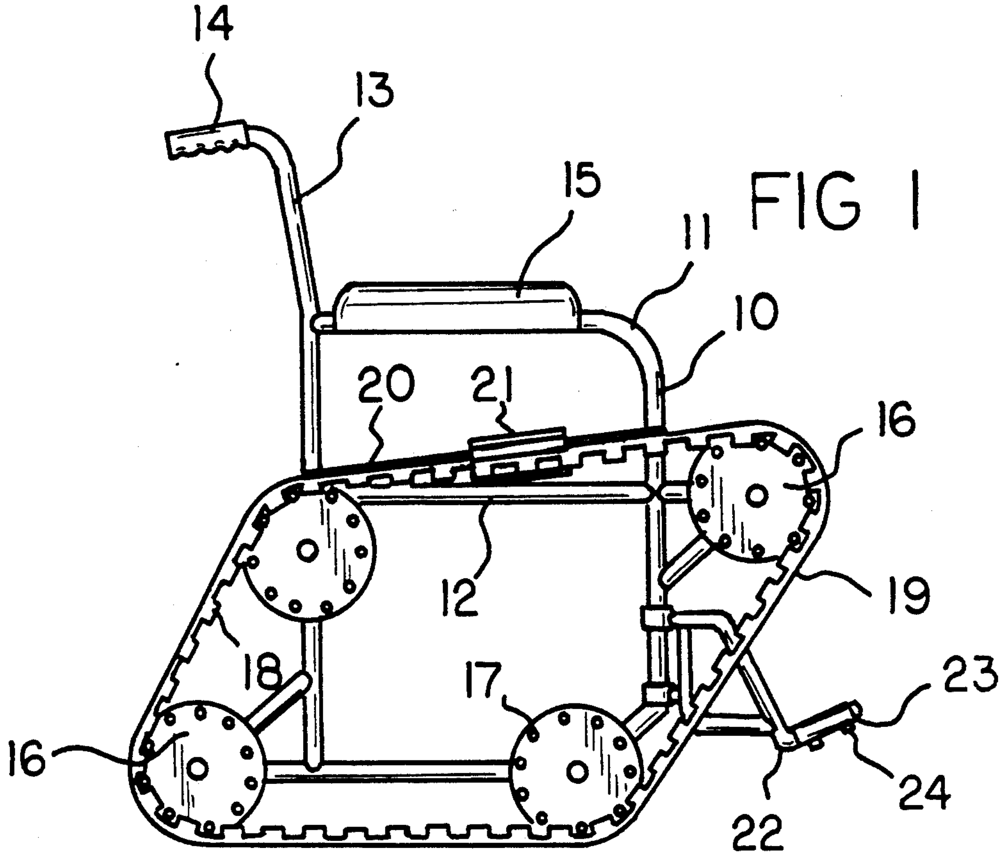
FIG. 1 is a side plan view of the present invention.

With reference now to the drawings, and in particular to FIG. 1 thereof, a new and improved wheelchair embodying the principles and concepts of the present invention and generally designated by the reference numeral 10 will be described.

More specifically the chair 10 comprises a supporting frame 11, a seat portion 12, and a seat back 13. Back 13 may be provided with conventional hand grips 14 for movement of the chair by other than the occupant. The chair 10 is provided with a conventional arm rest 15 and, departing from the usual large drive wheel and smaller forward wheel of each side as in conventional chairs, has four small wheels 16 mounted on each side of chair 10. Such wheels 16 (as is shown in detail below) have belt engaging stubs or spindles 17 uniformly spaced around and projecting from said wheels. Spindles 17 are adapted to engage with lugs 18 on a drive belt 19 extending over each of said wheels 16. Mounted on a rod 20 fastened to frame 11 and extending parallel with the upper run of belt 19, which is on an upward slant relative to the chair for comfort of the user, is a clamping hand grip 21 extending over rod 20 and under the bottom surface of the upper run of belt 19. While this hand grip 21 is detailed in other of the Figures herein, it provides (in conjunction with the user) the motive power for the chair 10. Also provided in attachment with frame 11, is a foot rest 22 extending forward from chair 11, said foot rest being provided on its lower surface 23 with one or more small casters 24.

Figure 2:
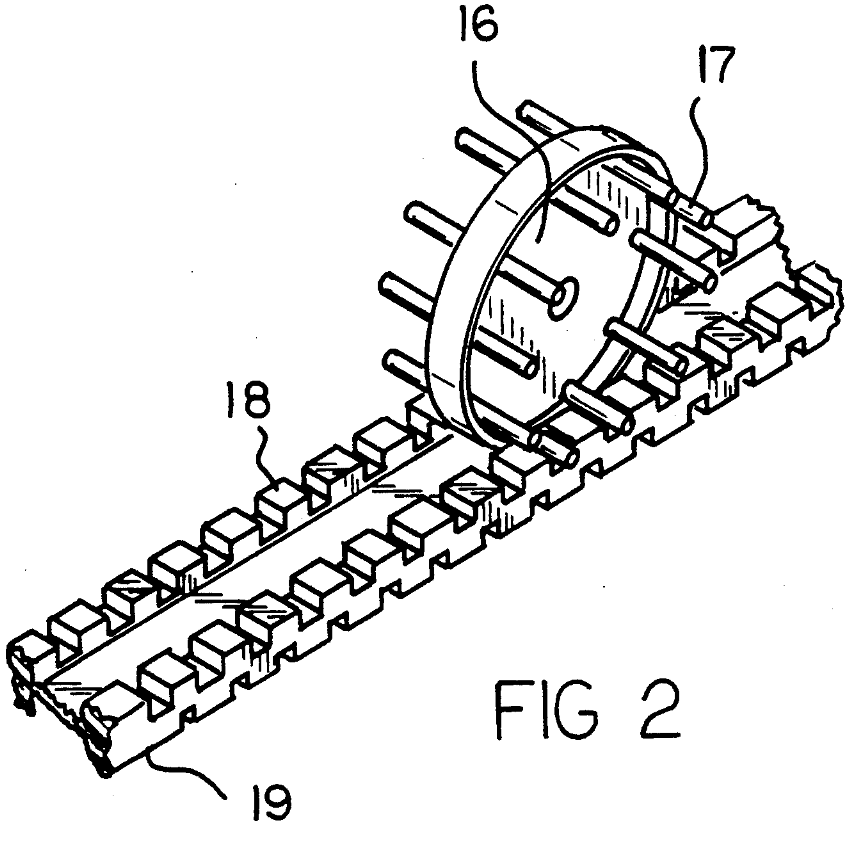
FIG. 2 is an exploded view of the drive belt and one of the wheels of FIG. 1.

Referring now to FIG. 2 an enlarged perspective view illustrates the engagement of spindles 17 extending outwardly from wheel 16 with the lugs 18 on drive belt 19.

Figure 3:
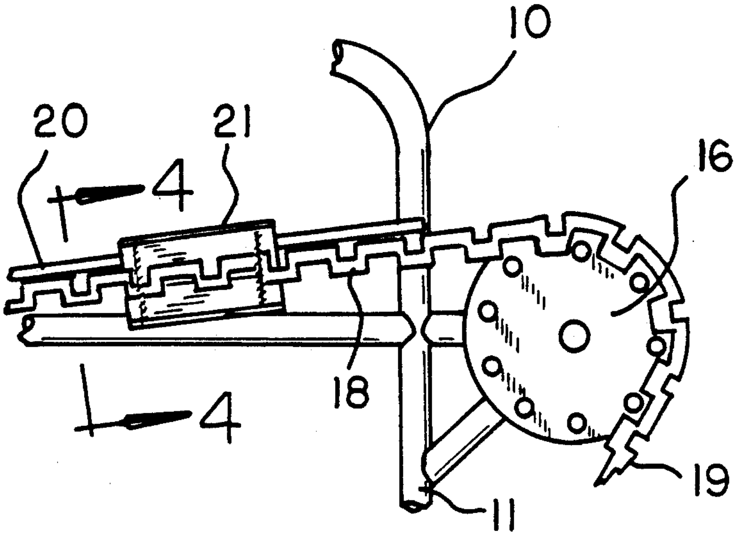
FIG. 3 is a partial side plan view showing the relationship of the hand grip to the drive belt and chair.

In FIG. 3, a partial side plan view illustrates in more detail the relationship of hand grip 21 to rod 20 and belt 19. Again reference numeral 11 designates the frame of the chair 10 supporting the wheels 16 and drive belt 19.

Figure 4:
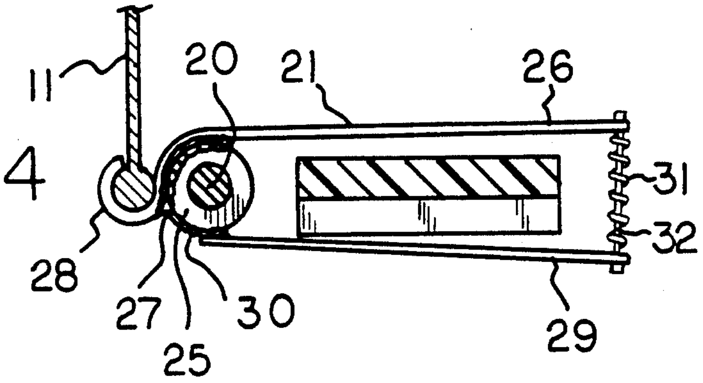
FIG. 4 is an end view on line 4—4 of FIG. 3.

FIG. 4, taken on line 4—4 of FIG. 3, shows in an end view the hand grip 21 and its association with the frame and belt. On this scale an additional element 25, namely a slidable bushing, can be seen. Bushing 25 has the upper surface plate 26 of handgrip 21 welded or secured fixedly thereto as at 27 with the inboard end 28 of upper surface plate 26 slideably engaging with the side frame 11 of chair 10. The lower surface plate 29, as shown in this drawing, is hingedly affixed to bushing 25 as at 30. Bushing 25 is positioned around rod 20 and is slidable thereon. Obviously the hand grip 21 could be formed of a single sheet of springable metal which would wrap around and be secured to bushing 25 if desired. The outer ends of upper surface plate 26 and lower surface plate 29 are normally held in spaced apart relationship by compression springs 31 wrapped about pins 32 as shown in more detail in FIG. 5. When gripped by a user's hand, the outer ends of plates 26 and 29 are forced towards one another engaging firmly with that portion of belt 19 extending therethrough. Pins 32 are floatingly mounted through either upper plate 26 or lower plate 29 to permit the pins 31 to extend through such plate as the ends of the plates are forced together.

Figure 5:
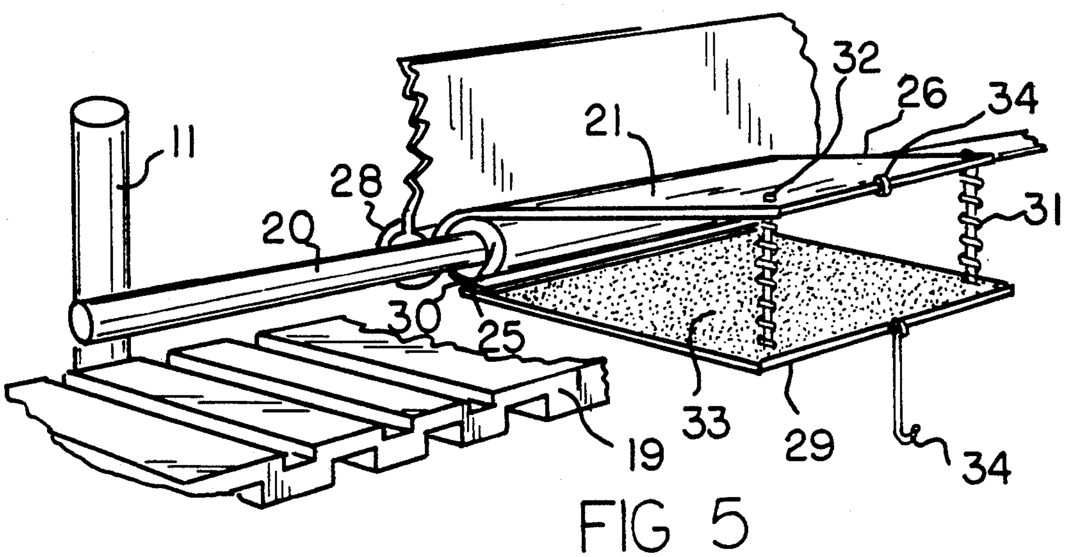
FIG. 5 is an enlarged perspective view of the clamp portion of the invention.

In operation, as more clearly shown in the enlargement of FIG. 5, squeezing hand grip 21 causes the outer ends of plates 26 and 29 to move towards each other engaging firmly the flight of belt 19 extending therebetween. Preferably the inner surfaces 3 of plates 26 and 29 are provided with a roughened or non-slip texture to provide better engagement with belt 19. When the user desires to move the chair forward, hand grip 21 is slid rearwardly (relative to the chair) with bushing 25 sliding on rod 20. The user grips such hand grip 21 and with the belt 19 firmly engaged therein moves such grip 21 forward causing the belt 19 to move with it. At the end of the forward travel of grip 21, pressure thereon is released and the grip returned to its rearward position to repeat the cycle. Obviously moving the cycle in reverse sequence will cause the track to move in the opposite direction and the chair to which it is affixed to back up. The mechanical arrangement shown is repeated on the other side of the chair so that belt 19 and its counterpart on the other side are independent of one another, permitting turning of the chair as desired. When it is desired to prevent movement of the chair, a simple latch 34 is provided to hold plates 26 and 29 in squeezed relationship preventing accidental movement of the belt 19 and wheels 16 associated therewith.

Figure 6:
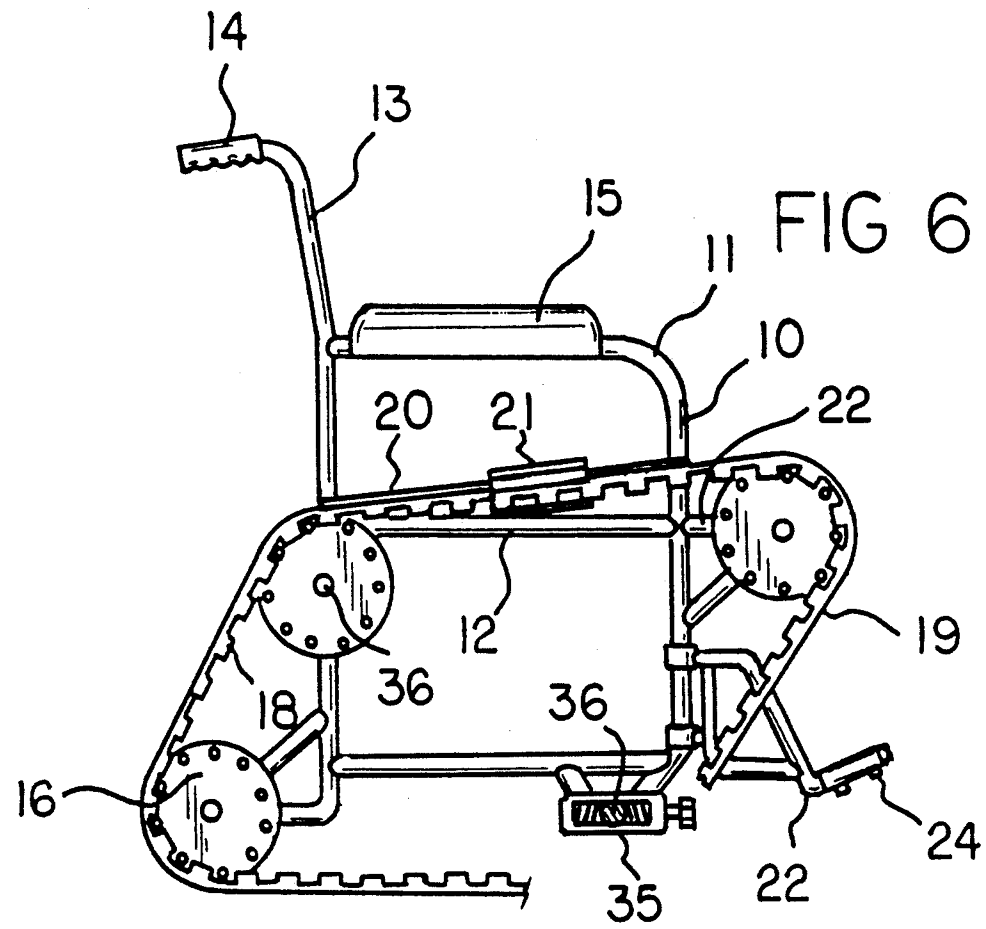
FIG. 6 is a partial side plan view of the invention showing the belt tensioning means associated with one of the wheel axles.
Figure 7:
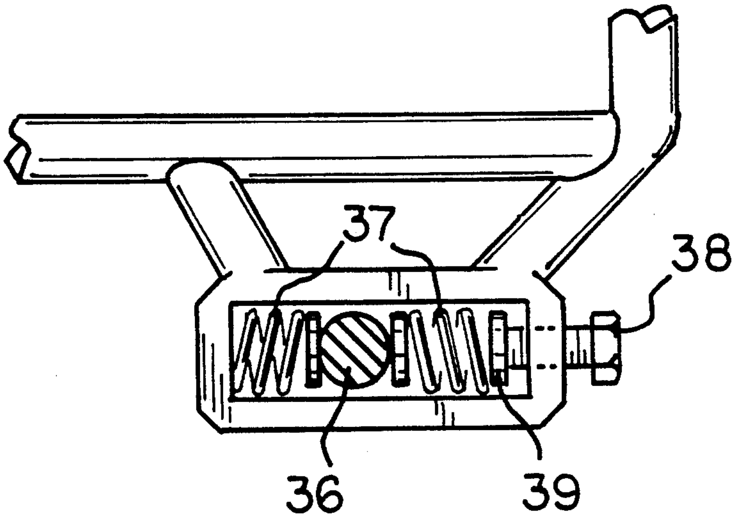
FIG. 7 is an enlarged side plan view of the belt tensioning means of FIG. 6.

In order to prevent loosening of belt 19 as it extends around wheels 16, tensioning means 35 are provided on at least one wheel 16 as shown in FIG. 6. Positioned on and in engagement with axle 36 is an adjustable spring device which will constantly urge axle 36 and associated wheel 16 forwardly to put tension on the belt 19 extending around wheels 16. FIG. 7 is an enlarged view of tensioning means 35 showing the compression springs 37 in engagement with axle 36. A bolt 38 and associated plate 39 are provided in engagement with spring 37 to control the amount of compression thereof.

Also shown in FIG. 6 are the casters 24 positioned on the bottom of footrest 22. Should the chair 10 drop down as in going off a curb or the like, such casters 24 will engage the ground and prevent chair 10 from toppling forward.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A self-propelled all terrain wheelchair comprising:

a frame including a back portion and a seat;

four axles mounted rotatably on said frame in a spaced relationship to one another;

wheels rotatably mounted on each of said axles, said wheels having belt engaging means thereon;

a cleated belt having a plurality of lugs thereon, said cleated belt extending around all four wheels and being in engagement with the belt engaging means thereof; and, a slidable hand grip slidably mounted on said frame and engagable with said belt to move said belt relative to said wheels.

2. The wheelchair of claim 1, wherein the belt engaging means on said wheels comprises a plurality of spindles projecting outwardly from each of said wheels, said spindles being substantially parallel to said axles and engaging with the lugs on said cleated belt.

3. The wheelchair of claim 2, wherein said slidable hand grip comprises:

a rod affixed to said frame and extending parallel with said cleated belt;

a busing slidably mounted on said rod;

an upper gripping plate coupled to said bushing and extending over said cleated belt; and, a lower gripping plate coupled to said bushing and extending under said cleated belt, whereby said gripping plates may be cooperatively engaged to a portion of said cleated belt extending between said gripping plates to facilitate a translation of said cleated belt over said wheels.

4. The wheelchair of claim 3, and further comprising at least one spring positioned between said gripping plates such that said plates remain spaced form said cleated belt until gripped by a user of said wheelchair.

5. The wheelchair of claim 4, and further comprising tensioning means coupled to one of said axles for constantly tensioning said cleated belt as it extends around said wheels.

6. The wheelchair of claim 4, and further comprising a forwardly-extending footrest coupled to said frame, and at least one caster affixed to a bottom of said foot rest to prevent the wheelchair from tipping over in a forward direction.

* * * * *